(12) United States Patent
Bromberg et al.

(10) Patent No.: US 9,234,482 B2
(45) Date of Patent: Jan. 12, 2016

(54) ULTRA-HIGH EFFICIENCY ALCOHOL ENGINES USING OPTIMIZED EXHAUST HEAT RECOVERY

(71) Applicant: Massachusetts Institute of Technology, Cambridge, MA (US)

(72) Inventors: Leslie Bromberg, Sharon, MA (US); Daniel R. Cohn, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 143 days.

(21) Appl. No.: 13/952,766

(22) Filed: Jul. 29, 2013

(65) Prior Publication Data

US 2014/0034002 A1    Feb. 6, 2014

Related U.S. Application Data

(60) Provisional application No. 61/678,707, filed on Aug. 2, 2012.

(51) Int. Cl.
*F02M 25/00* (2006.01)
*F02M 21/02* (2006.01)
(Continued)

(52) U.S. Cl.
CPC .............. *F02M 25/00* (2013.01); *F01K 23/065* (2013.01); *F01N 5/02* (2013.01); *F02D 19/0644* (2013.01);
(Continued)

(58) Field of Classification Search
CPC ... F02M 21/00; F02M 21/0209; F02M 25/00; F02M 31/16; F01K 23/065; F02D 41/0025; Y02T 10/36; F01N 5/02

USPC .............. 123/1 A, 3, 543, 557, 568.11, 575
See application file for complete search history.

(56) References Cited

U.S. PATENT DOCUMENTS 4,382,843 A *  5/1983  Black .............................. 203/19
4,407,238 A   10/1983  Yoon
(Continued)

FOREIGN PATENT DOCUMENTS

DE         195 34 433 C1   10/1996
DE      10 2009 039551 A1    3/2011
(Continued)

OTHER PUBLICATIONS

Machine Translation of Detailed Description, DE102009039551A1, Gotter et al., obtained from http://worldwide.espacenet.com/, pp. 1-7.*

(Continued)

*Primary Examiner* — Lindsay Low
*Assistant Examiner* — Grant Moubry
(74) *Attorney, Agent, or Firm* — Sam Pasternack; MIT Technology Licensing Office

(57) ABSTRACT

Engine system using alcohol Rankine heat recovery where the engine heat converts alcohol into hydrogen-rich gas which is then introduced into the engine cylinders. The engine system includes a source of liquid alcohol along with an internal combustion engine generating a high temperature exhaust. Structure is provided for introducing a first portion of the liquid alcohol into the engine and a series of heat exchangers forming a Rankine heat recovery cycle is provided to extract heat from the exhaust and transferring the heat to a second portion of the liquid alcohol, causing it to change phase to a gaseous alcohol. A heat exchanger/catalyst is heated by the exhaust to reform the gaseous alcohol into a hydrogen-rich reformate.

9 Claims, 10 Drawing Sheets

(51) Int. Cl.
   *F01N 5/02*    (2006.01)
   *F02M 25/12*   (2006.01)
   *F02D 41/00*   (2006.01)
   *F02D 19/06*   (2006.01)
   *F01K 23/06*   (2006.01)

(52) U.S. Cl.
   CPC ........ *F02D 19/0655* (2013.01); *F02D 19/0671* (2013.01); *F02D 41/0027* (2013.01); *F02M 21/0209* (2013.01); *F02M 25/12* (2013.01); *F02D 41/0025* (2013.01); *Y02T 10/36* (2013.01)

(56) References Cited

U.S. PATENT DOCUMENTS

| | | | |
|---|---|---|---|
| 4,444,158 | A | 4/1984 | Yoon |
| 4,499,863 | A | 2/1985 | Gandhi et al. |
| 4,567,857 | A | 2/1986 | Houseman et al. |
| 6,142,222 | A * | 11/2000 | Kang et al. ............ 165/148 |
| 7,770,545 | B2 * | 8/2010 | Morgenstern ............ 123/3 |
| 8,100,093 | B2 * | 1/2012 | Morgenstern ............ 123/3 |
| 8,127,829 | B2 * | 3/2012 | Sabatino et al. ......... 165/80.3 |
| 8,677,949 | B2 * | 3/2014 | Bromberg et al. ........ 123/3 |
| 8,967,089 | B2 * | 3/2015 | Morgenstern et al. .... 123/3 |
| 2005/0229872 | A1 | 10/2005 | Lange |
| 2010/0077746 | A1 | 4/2010 | Gray, Jr. |
| 2010/0206249 | A1 * | 8/2010 | Bromberg et al. ........ 123/3 |
| 2010/0230084 | A1 * | 9/2010 | Luo et al. ............... 165/182 |

FOREIGN PATENT DOCUMENTS

| | | | |
|---|---|---|---|
| WO | 00 76651 | A1 | 12/2000 |
| WO | 2012 057691 | A1 | 5/2012 |
| WO | 2013 055673 | A1 | 4/2013 |

OTHER PUBLICATIONS

J. Agrell et al., Production of Hydrogen by Partial Oxidation of Methanol Over Cu/ZnO catalysts prepared by Microemulsion Technique, Applied Catalysis, 2001, 239-259, 211, US.

P. Mitzey et al., The Kinetics of Methanol Decomposition: A Part of Autothermal Partial Oxidation to Produce Hydrogen for Fuel Cells, Applied Catalysis, 2001, 233-237, 213, US.

S. Velu et al., Oxidative Steam Reforming of Methanol over CuZnAl(Zr)—Oxide Catalysts for the Selective Production of Hydrogen for Fuel Cells: Catalyst Characteriazation and Performance Evaluation, Journal of Catalysis, 200, 373-384, 194, US.

Lindstrom et al., Development of a methanol fuelled reformer for fuel cell applications. Journal of Power Sources, 2003, 71-78, 118, US.

Nelson, Exhaust Energy Recovery, DOE 2010 Annual Merit Review, 2010, 1-24, US.

Blumberg et al., Simulation of High Efficiency Heavy Duty Si Engines Using Direct Injection of Alcohol for Knock Avoidance, SAE Powertrains, Fuel and Lubricants, 2008, 1-20, US.

Pettersson et al., Decomposed Methanol as a Fuel—A review, Combust.. Sci. and Tech., 1991, 265-303, 80, UK.

Yu, Effect of the metal foam materials on the peprformanc of methanol steam micro-reformer for fuel cells, Applied Catalysis A:, General, 2007, 106-113, 327, US.

International Searching Authority for PCT/US2013/052691 mailed on Nov. 6, 2013.

Leslie Bromberg, et al., Ultra-High Efficiency Methanol Engines with Advanced Exhaust Energy Recovery, 20th International Symposium on Alcohol Fuels (ISAF). Mar. 26, 2013, US.

Notification of International Preliminary Report on Patentability for PCT/US2013/052591 mailed on Feb. 12, 2015.

\* cited by examiner

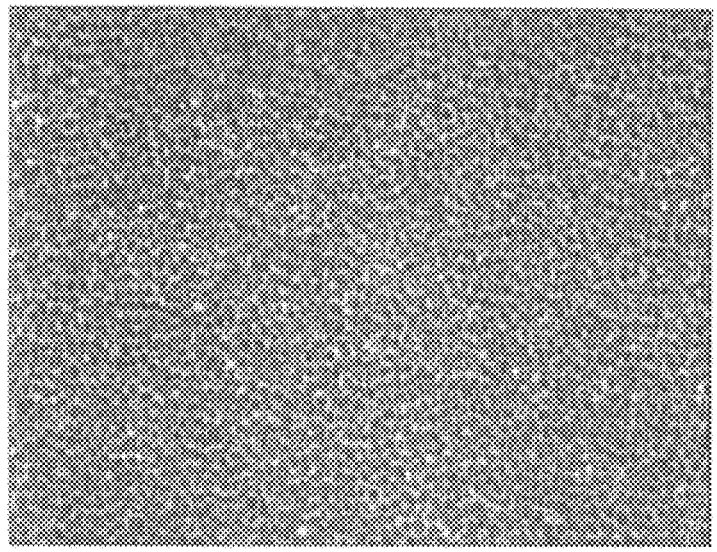

Characteristics of Duocel Copper Foam (8% Density, C10100)

| | | |
|---|---|---|
| Compression Strength | 131 psi | (0.903 MPa) |
| Tensile Strength | 1000 psi | (6.9 MPa) |
| Modulus of Elasticity | 107 kpsi | (736 MPa) |
| Shear Modulus | 40.9 kpsi | (282 MPa) |
| Specific Heat | 0.092 BTU/ft·°F | (0.385 J/B·°C) |
| Bulk Thermal Conductivity | 5.84 BTU/ft·hr·°F | (10.1 W/m·°C) |
| CTE (20-100°C) | $9.44 \times 10^{-6}$ in/in·°F | ($1.7 \times 10^{-5}$ m/m·°C) |
| Bulk Resistivity | $2.56 \times 10^{-5}$ ohm·in | ($6.5 \cdot 10^{-5}$ ohm·cm) |
| Melting Point | 1980°F | (1080°C) |
| Relative Density range | 5-12%° | |
| Pore Sizes | 5, 10, 20, 40 | Pores Per Inch* |

FIG. 8

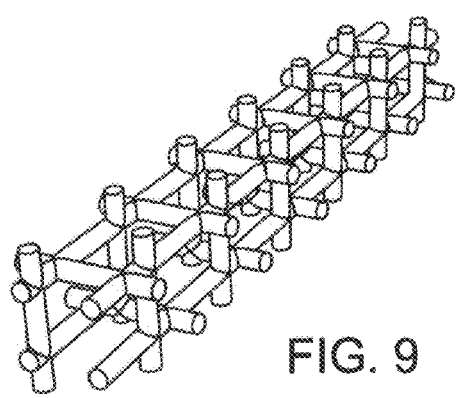

FIG. 9

ULTRA-HIGH EFFICIENCY ALCOHOL ENGINES USING OPTIMIZED EXHAUST HEAT RECOVERY

This application claims priority to provisional patent application No. 61/678,707 filed on Aug. 2, 2012, the contents of which are incorporated herein by reference.

BACKGROUND OF THE INVENTION

This invention relates to internal combustion engines and more particularly to an engine that uses engine exhaust to heat and reform an alcohol to produce a hydrogen-rich gas reformate that is introduced into the engine.

There has been recent increasing interest in methanol as an alternative fuel for both light and heavy-duty vehicles, particularly in China. This interest has resulted from methanol being the most efficiently and inexpensively produced liquid fuel that can be made from coal and natural gas and also from thermochemical conversion of biomass and waste materials.

In addition to these advantages methanol has a unique set of properties that give it the potential for a substantial increase in efficiency of vehicular engines. One of these properties is its level of knock suppression in spark ignition engines, especially when it is directly injected.

A second property is low temperature endothermic reforming into hydrogen-rich gas, which can then be combusted in the engine. The endothermic reforming can be used in heat recovery from the engine exhaust and the hydrogen-rich gas can be used to further increase efficiency by enabling highly dilute (ultra-lean or heavy EGR) spark ignition operation.

Previous work has been done on taking advantages of these properties. However, it fell substantially short of obtaining the full efficiency increase that can be obtained from methanol-fueled engines.

Extensive literature exists describing thermal decomposition reforming of methanol at low temperature, where energy from the exhaust is used in a substantially endothermic process [J. Agrell, K. Hasselbo, K. Jansson et al., *Appl. Catal. A: General* 211 (2) (2001) 239; P. Mizsey, E. Newson, T. Truong et al., *Appl. Catal. A: General* 213 (2) (2001) 233; S. Velu K. Suzuki, M. Okazaki, et al., *J. Catal.* 194 (2) (2000) 373; Lindstrom B., Pettersson, L. J. *Development of a methanol fueled reformer for fuel cell applications, Journal Power Sources* 118, 71e8, (2003)]. The thermal decomposition reforming reaction is:

The reaction products are referred to as "reformate," "hydrogen-rich gas" or "syngas". The nominal heating value of the reformate is around 14% greater than that of methanol.

For ethanol, the thermal decomposition is given by

The reaction products in this low temperature ethanol reformation increase the nominal heating value of the ethanol by about 7%.

The amount of work that has been done on ethanol reforming and the use of the reformate in engines is substantially less than the amount of work that has been done on methanol reforming.

Table 1 shows thermodynamic properties of methanol and ethanol near the boiling point, and those of their reformates near the boiling point, to highlight the differences in the reforming process (rather than the phase change). The conditions of the liquid, the gas and the reformate around the boiling point of the liquid are shown, for both 1 bar and 15 bar pressure. The enthalpy of the methanol reformate is about 3000 kJ/Kg higher at both 1 and 15 bar) than methanol gas; for ethanol the enthalpy of its reformate is 1000 kJ/kg higher than the ethanol gas. Since the heating value of methanol is about 20 MJ/kg and that of ethanol is about 27 MJ/kg, the methanol enthalpy change in the reformation process is substantial for methanol, but rather small for ethanol.

TABLE 1

| Thermodynamic properties of methanol and ethanol, and their reformates | | | | | | |
|---|---|---|---|---|---|---|
| | | Temperature (K) | Pressure (MPa) | Density (kg/m3) | Enthalpy (kJ/kg) | Entropy (kJ/kg K) |
| Methanol | | | | | | |
| Liquid | $CH_3OH$ | 337 | 0.1 | 749.0 | −7.32E+03 | 4.39E+00 |
| gas | $CH_3OH$ | 338 | 0.1 | 1.2 | −6.21E+03 | 7.67E+00 |
| reformate | $2H_2 + CO$ | 338 | 0.1 | 0.4 | −3.34E+03 | 1.52E+01 |
| Liquid | $CH_3OH$ | 425 | 1.5 | 643.5 | −6.95E+03 | 5.28E+00 |
| gas | $CH_3OH$ | 430 | 1.5 | 16.7 | −6.07E+03 | 7.33E+00 |
| reformate | $2H_2 + CO$ | 430 | 1.5 | 4.4 | −3.09E+03 | 1.37E+01 |
| Ethanol | | | | | | |
| Liquid | $C_2H_5OH$ | 350 | 0.1 | 737.9 | −5.88E+03 | 3.89E+00 |
| gas | $C_2H_5OH$ | 360 | 0.1 | 1.6 | −5.01E+03 | 6.37E+00 |
| reformate | $CH_4 + CO + H_2$ | 360 | 0.1 | 0.5 | −3.90E+03 | 1.21E+01 |
| Liquid | $C_2H_5OH$ | 400 | 1.5 | 682.6 | −5.66E+03 | 4.42E+00 |
| gas | $C_2H_5OH$ | 445 | 1.5 | 22.7 | −4.86E+03 | 6.26E+00 |
| reformate | $CH_4 + CO + H_2$ | 445 | 1.5 | 6.2 | −3.71E+03 | 1.11E+01 |

For methanol, the heat of vaporization is about 1000 kJ/kg, while for ethanol it is about 800 kJ/kg.

Another option for exhaust heat recovery from vehicular engines is a Rankine bottoming cycle, similar to that used in electricity generation. In this closed cycle a working fluid (water in electrical power plants) is compressed, heated/vaporized, expanded through a turbine, recooled and recompressed. Organic fluids have been considered for vehicular applications because of advantageous thermodynamic properties, chemical compatibility and stability.

Particular attention has been given to Rankine cycle heat recovery in heavy duty powered vehicles (where diesel engines predominate) because of the great importance of fuel efficiency in applications where there is a large fuel cost per year. However, these Rankine cycles, which did not use methanol or ethanol, captured only a modest fraction of the energy that could be recovered and required a complicated and expensive system to recondense the organic working fluid.

An example of Rankine cycle energy recovery using an organic fluid in a diesel engine vehicle is work reported by Nelson of Cummins Engines, in a DOE funded project. [Chris Nelson, *Exhaust Energy Recovery*, 2010 Annual Merit Review, Jun. 10, 2010, available at http://www1.eere.energy.gov/vehiclesandfuels/pdfs/merit_review_2010/higheff$_{13}$ engine_tech/ace 041_nelson_2010_o.pdf]

FIG. 1 shows the initial concept of the prior art Cummins program. There are three loops. In the exhaust loop a fraction of the exhaust from the engine exhaust heat exchanges with the organic fluid in the WHR (Waste Heat Recovery) unit. The fraction is controlled by the EGR valve. The cooler exhaust is then combined with the air, and then cooled further by the cooler organic fluid. Combined EGR/air is then introduced into the engine.

The organic fluid is compressed and then heated in the CCAC (Combined Charge Air Cooler) heat exchanger. The organic fluid is then further heated by the exhaust in the het exchanger marked EGR WHR. The organic fluid is then expanded in the turbine, cooled/condensed by water/engine coolant, and then recompressed.

Finally, the last circuit is the engine coolant loop. The fraction of the energy from the exhaust not recovered in the turbine is then disposed off in a liquid-air heat exchanger (i.e., radiator).

Nelson initially predicted a 10% Brake Thermal Efficiency (BTE) benefit, using R245fa as an organic working fluid. However, the Cummins program had problems in the CCAC with condensation and corrosion, as the material chosen for the heat exchanger was aluminum. The effort changed focus because of these difficulties, and moved to provide energy recovery during off-peak operating conditions, with about 5% waste energy recovery from the exhaust.

It should be noted that in addition to the issues with the heat exchanger, there was a substantial increase in heat rejection complexity, as a condenser cooler was needed to remove in a radiator the bulk of the power that was recovered from the exhaust. Indeed, assuming an efficiency of 30% for the Rankine cycle, 70% of the energy recovered from the exhaust needs to be removed through a radiator instead of just being released by the exhaust.

SUMMARY OF THE INVENTION

The engine system according to the invention includes a source of liquid alcohol and an internal combustion engine generating a high temperature exhaust. A structure is provided for introducing a first portion of the liquid alcohol into the engine. A series of heat exchangers forming a Rankine heat recovery cycle extracts heat from the exhaust and transfers the heat to a second portion of the liquid alcohol causing it to change phase to a gaseous alcohol. A heat exchanger/catalyst is heated by the exhaust and reforms the gaseous alcohol into a hydrogen-rich reformate. Valve structure rapidly introduces the reformate into the engine for combustion, and a control system is provided for controlling the ratio of the first and second portions of the liquid alcohol to maximize the amount of the second portion of the liquid alcohol while using a minimal amount of the first portion needed to prevent knock.

One embodiment of the invention includes a turbine through which the reformate flows before introduction into the engine. It is preferred that the engine be operated with a lean fuel-to-air ratio. The engine may also be operated with heavy EGR. A preferred embodiment is to send the reformate directly into the engine.

In another preferred embodiment the heat exchangers include a metallic foam that may be disposed on fins. Suitable alcohols include methanol and ethanol. It is also preferred that the engine be a spark ignition engine and that the reformate is introduced into the engine cylinders.

It is therefore an object of the present invention to combine a Rankine heat recovery cycle that takes advantage of the special properties of methanol with a novel heat exchanger technology along with a control system that maximizes the amount of methanol that can be used in the Rankine cycle while meeting the requirement for knock suppression in a high compression ratio, highly turbocharged spark ignition engine.

The engine of the invention provides a substantial improvement in efficiency relative to existing internal combustion engines and significantly improves the economic and environmental attractiveness of natural gas and coal-derived fuel. The engine of the invention can provide a 15-25% more fuel efficiency than a heavy-duty diesel engine used in long haul trucking, and 20-30% more efficiency than a heavy-duty vehicle used in non-long-haul applications. The engine of the invention is also likely to be 50-60% more fuel efficient than a conventional port fuel injected gasoline light duty vehicle engine. The engine technology disclosed herein can also be utilized in ethanol powered vehicles with reduced fuel efficiency benefits relative to use with methanol (e.g., perhaps a 15-25% fuel efficiency benefit for a heavy-duty vehicle used in non-long-haul applications).

BRIEF DESCRIPTION OF THE DRAWING

FIG. 8 is a photograph of a Duocel Copper Foam.

FIG. 9 is a perspective view of a simple model of foam. Shown are ligands within the foam with multiple cells to investigate performance away from inlets/outlets.

DESCRIPTION OF THE PREFERRED EMBODIMENT

Figure 1:
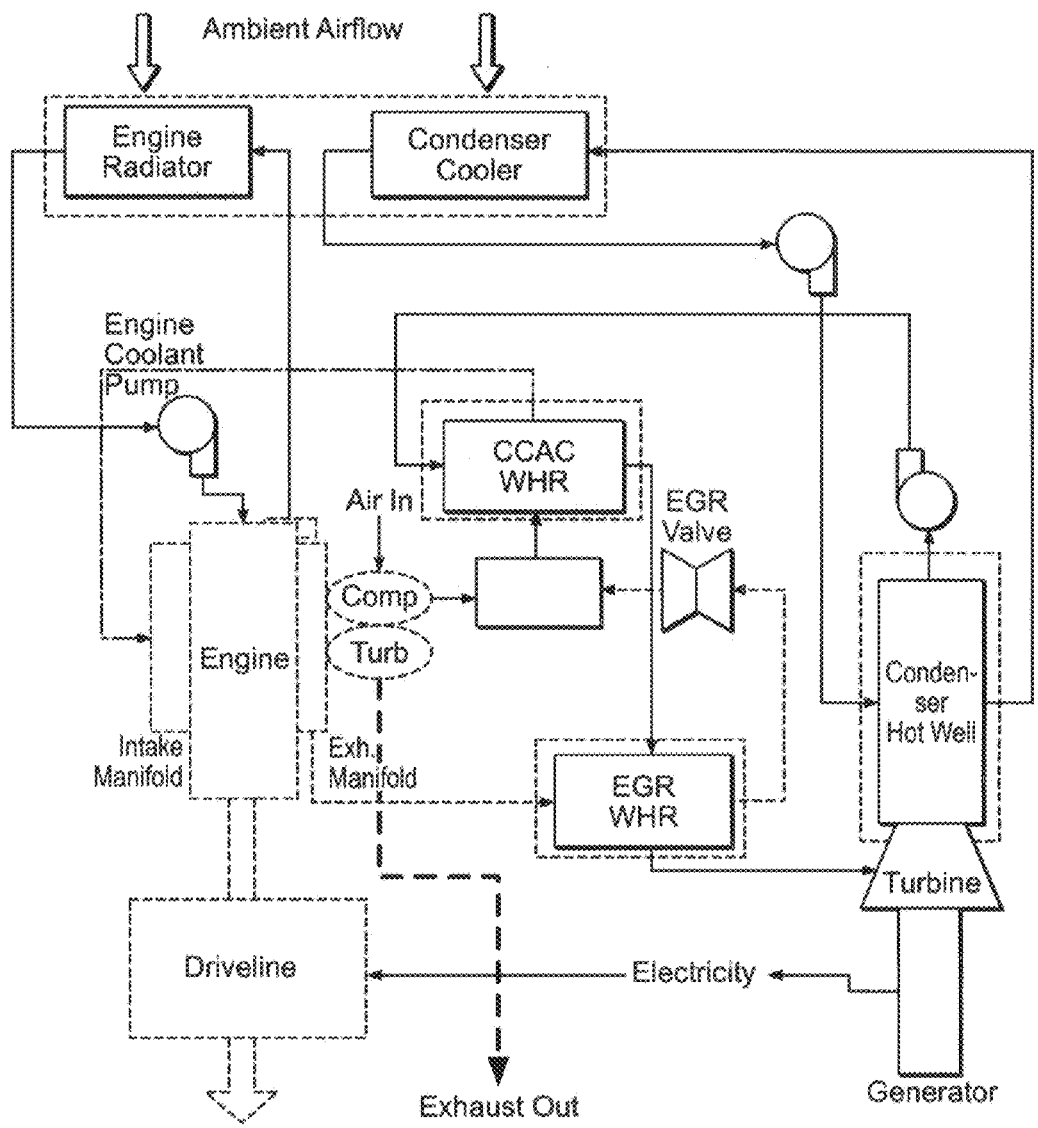
FIG. 1 is a block diagram for a prior art Rankine cycle engine from the Cummins Engine company.

We have performed preliminary calculations of heat recovery from present methanol reforming and Rankine cycle heat recovery systems. We used the engine model developed by Blumberg and Bromberg [P. N. Blumberg, L. Bromberg et al., *Simulation of High Efficiency Heavy Duty SI Engines Using Direct Injection of Alcohol for Knock Avodiance*, SAE Report 2008-01-2447].

The model is based upon a 7 liter engine spark ignition (SI) engine which is considered as a replacement for 11 liter Volvo HD diesel engine. The potential for energy recovery from the exhaust have been discussed previously by Bromberg, and Cohn [L. Bromberg and D. R. Cohn, SAE technical paper 2010-01-2199], although the method capable of recovering the energy was not discussed.

Table 2 shows the results of the model. There are two sets of assumptions, depending on whether the conditions downstream from the turbine or upstream from it are used. The turbocharger has not been included in the model for the upstream case. However, it would be useful to have limited heat recovery upstream from the turbocharger in order to limit the temperature at the turbine. It may also be possible to use the reformate in the turbocharger, instead of the engine exhaust. The results downstream from the turbocharger are based on the assumption that the energy recovery starts at 200 C. Table 2 assumes that the heat recovery starts at the temperature of the engine coolant, or about 100 C. It is assumed that there is no heat loss in the system, representing the maximum potential of the approach; the pipes are well insulated and the heat exchange is ideal. It should be possible to get the temperatures of the two fluids to within 50 C (see the section on heat-exchanger design below).

TABLE 2

Characteristics of a stoichiometric engine at a few specified points in the ESC (European heavy duty engine Stationary Cycle) and potential for energy recovery.

|  |  | A100 | B25 | B50 | B75 | B100 |
| --- | --- | --- | --- | --- | --- | --- |
| Fuel energy flow rate | kJ/s | 660 | 221 | 398 | 564 | 742 |
| Post turbine energy recovery |  |  |  |  |  |  |
| Temperature, post turbine | (K) | 849 | 787 | 869 | 880 | 884 |
| Mass flow rate | kg/s | 0.24 | 0.08 | 0.14 | 0.20 | 0.26 |
| Recoverable energy (to 200 C.) | kJ/s | 81 | 21 | 52 | 77 | 102 |
| Fraction recoverable |  | 12% | 9% | 13% | 13% | 14% |
| Pre turbine energy recovery |  |  |  |  |  |  |
| Temperature, downstream from engine |  | 948 | 792 | 897 | 942 | 973 |
| Lower temperature limit: 400 C. |  |  |  |  |  |  |
| Recovertable energy |  | 81 | 11 | 39 | 68 | 98 |
| Fraction recoverable |  | 12% | 5% | 10% | 12% | 13% |
| Lower temperature limit: 300 C. |  |  |  |  |  |  |
| Recovertable energy |  | 110 | 21 | 57 | 93 | 131 |
| Fraction recoverable |  | 17% | 10% | 14% | 16% | 18% |
| Lower temperature limit: 200 C. |  |  |  |  |  |  |
| Recovertable energy |  | 140 | 31 | 74 | 118 | 164 |
| Fraction recoverable |  | 21% | 14% | 19% | 20% | 22% |
| Lower temperature limit: 100 C. |  |  |  |  |  |  |
| Recovertable energy |  | 169 | 40 | 92 | 143 | 197 |
| Fraction recoverable |  | 26% | 18% | 23% | 25% | 27% |

It can be seen that there is the potential for substantial energy recovery, depending on the engine operating conditions (temperature and flow rates), as well as the temperature at the outlet of the exhaust heat exchanger. Over 20% of the fuel energy could be recovered if the energy about 200C is recovered. Thus there is the potential a very attractive means of energy recovery.

In the case of lean operation, we have performed simple extrapolations to determine the energy that is recoverable. The results are shown in Table 3. In this table, we have assumed that the minimum temperature in the exhaust is at 100 C. In this case, the potential is smaller, due to the lower exhaust temperature with lean burn operation (with an air-fuel ratio of $\lambda \sim 2$).

TABLE 3

Potential for energy recovery with lean-burn engines ($\lambda \sim 2$)

|  |  | A100 | B25 | B50 | B75 | B100 |
|---|---|---|---|---|---|---|
| Fuel energy flow rate | kJ/s | 660 | 221 | 398 | 564 | 742 |
| Temperature, downstream from engine | (K) | 548 | 488 | 528 | 546 | 557 |
| Lower temperature limit: 200 C. |  |  |  |  |  |  |
| Recoverable energy |  | 44 | 3 | 19 | 37 | 55 |
| Fraction recoverable |  | 7% | 1% | 5% | 6% | 7% |
| Lower temperature limit: 100 C. |  |  |  |  |  |  |
| Recoverable energy |  | 103 | 22 | 54 | 87 | 121 |
| Fraction recoverable |  | 16% | 10% | 14% | 15% | 16% |

In the case of a conventional Rankine cycle, there is a problem with the limited heating of organic fluid, complications with the recondensation and heat rejection of the low pressure steam. Limited recovery is possible in this scheme.

These problems could be removed by using a Rankine cycle that operates with the alcohol fuel as the working fluid, with or without reformation. In this manner, it is possible to avoid the problems associated with recooling and recondensing the working fluid in the Rankine cycle.

Figure 2:
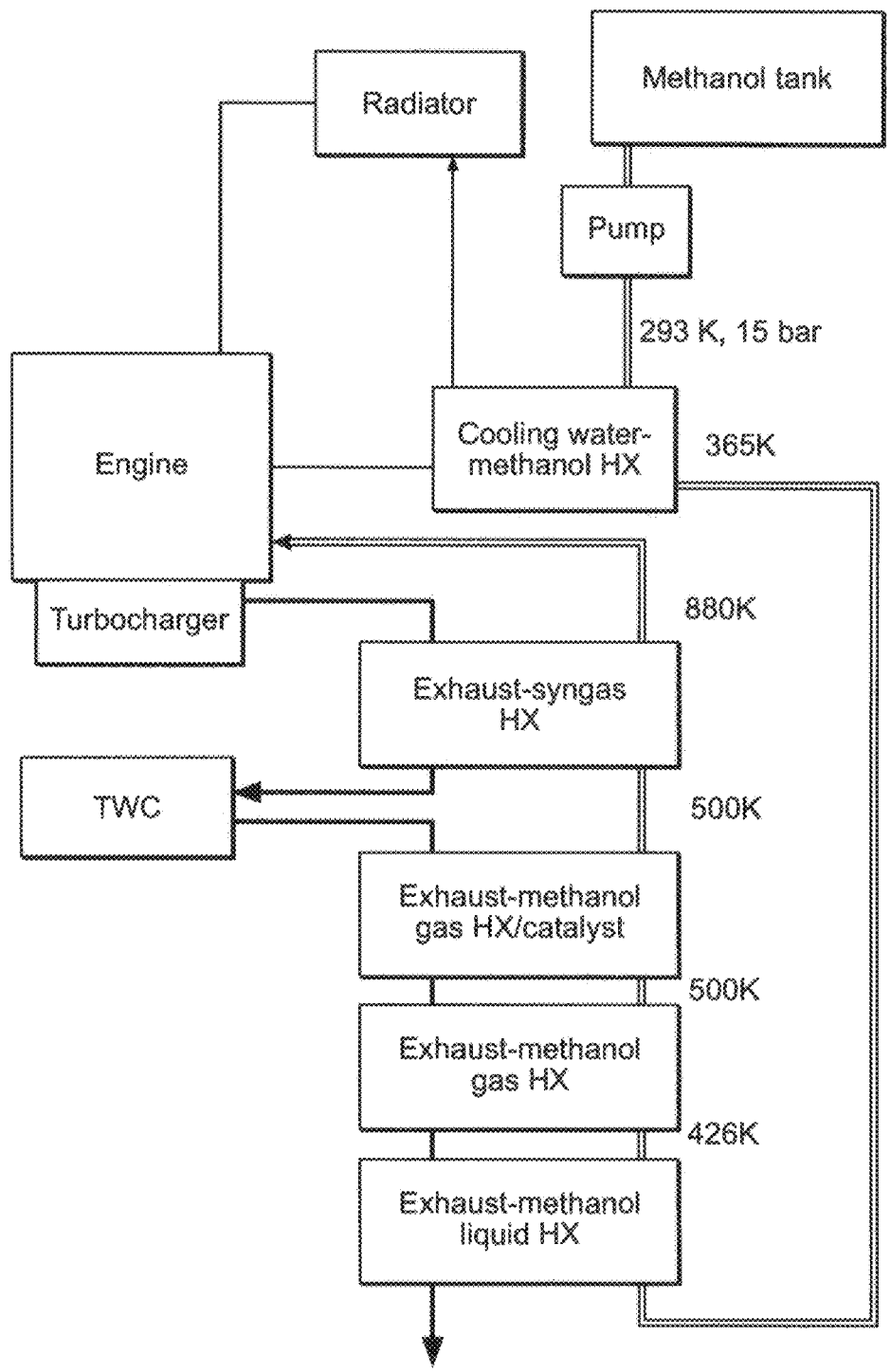
FIG. 2 is a block diagram of a methanol Rankine cycle with high pressure, high temperature fluid introduced at high pressure into an engine.

A schematic of such a system is shown in FIG. 2. Methanol (or ethanol) is removed from the tank and compressed to relatively high pressures (15 bar in the example in FIG. 2). The compressed liquid is heated by the cooling water, actually reducing substantially the heat load that the radiator needs to reject. The alcohol is now at about 365 K ($\rho$C, usually the warm water temperature). The alcohol is then introduced into a counter-flow heat exchanger (HX) that is heated by the exhaust. It is heated until about 426 K, where it boils. The gas is then superheated by the heat exchanger, in the example in FIG. 2, to 500 K. At this temperature, the alcohol is introduced into a heat exchanger/catalyst, and it is reformed. Further heating of the reformate occurs downstream. The objective is to prevent coking of the heat exchanger, which could occur at temperatures about 500 C, or generation of DME (di-Methyl-Ether). The high pressure, high temperature syngas is the introduced into the engine, after the inlet valve has closed. The syngas is then further compressed by the cylinder and ignited. The engine is a spark ignition engine that uses a three way catalyst (TWC). It should be noted that the efficacy of the approach is not limited by the efficiency of the reformation process, as a large fraction of the energy in the exhaust goes into heating the compressed methanol.

The system shown in FIG. 2 introduces the energy recovered from the exhaust directly into the engine. Options for addressing the challenge of rapid introduction of the reformate into the cylinder include the use of valves that are optimized for rapid introduction of gaseous fuel. Air fuel mixing with late injection of reformate is desired, although in the case that it does not, it could be used for improving ignition (if it is injected such that there is an abundance of the reformate in the neighborhood of the spark at the time of spark firing).

Figure 3:
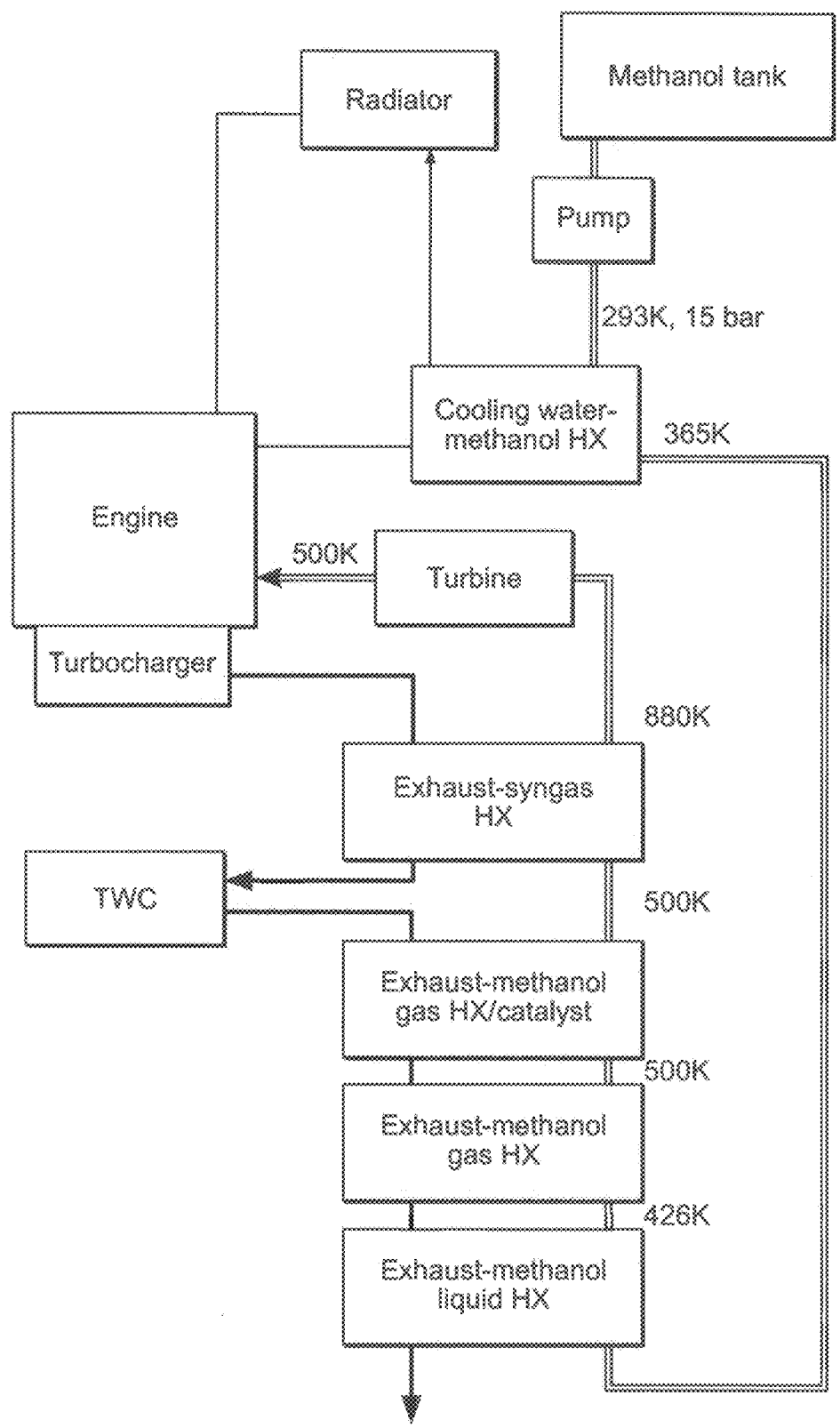
FIG. 3 is a block diagram of an embodiment of the invention in which high temperature, high pressure fluid is expanded through a turbine, resulting in lower pressure, cooler fluid being introduced into an engine.

An alternative approach that is closer to the one described by Nelson is shown in FIG. 3. Instead of injection the high pressure high temperature reformate directly into the engine, the reformate is expanded through a turbine. The lower pressure, lower temperature reformate downstream from the turbine is then introduced into the engine. It would be possible to combine it with the charge air downstream from the turbocharger.

We have made preliminary calculations of an ideal system as shown in FIG. 2. Table 4 shows the potential for energy recovery if engine fuel is the working fluid in the Rankine cycle.

Comparing the required enthalpy to heat and reform all the methanol from room temperature to the engine exhaust temperature, with no heat losses, with those of available energy indicate that it would be possible to use most of the available energy in heating and reforming the fuel. It is undersirable to reduce the temperature the exhaust below 100 C to prevent condensation in the exhaust.

TABLE 4

Potential for energy recovery if fuel is working fluid (assuming that all the methanol is heated)

|  |  | A100 | B25 | B50 | B75 | B100 |
|---|---|---|---|---|---|---|
| air flow rate | kg/s | 0.217 | 0.072 | 0.131 | 0.187 | 0.242 |
| methanol flow rate | kg/s | 0.034 | 0.011 | 0.020 | 0.029 | 0.038 |
| Methanol heating and boiling |  |  |  |  |  |  |
| Energy from 32 C. to 92 C. (cooling water) | kJ/s | 7.0 | 2.3 | 4.2 | 6.0 | 7.8 |
| Energy from 92 C. to boiling temp | kJ/s | 6.8 | 2.3 | 4.1 | 5.9 | 7.6 |
| Vaporization energy | kJ/s | 28.6 | 9.5 | 17.2 | 24.6 | 31.9 |
| Total energy for heating | kJ/s | 35.4 | 11.8 | 21.3 | 30.5 | 39.5 |
| Reforming | kJ/s | 94.5 | 31.4 | 56.8 | 81.2 | 105.5 |
| Superheating to max temp | kJ/s | 41.4 | 11.8 | 26.1 | 38.2 | 50.0 |
| Total energy into methanol | kJ/s | 171.4 | 55.0 | 104.2 | 149.9 | 195.0 |
| Available enthalpy to 100 C. | kJ/s | 169 | 40 | 92 | 143 | 197 |

It should be noted that some of the heating of the methanol can be done from the engine water coolant, although the energy required to preheat the methanol by the coolant is relatively small. The energy provided by the water coolant preheating the methanol is not included in the "Total energy into methanol" in Table 4. By using high pressure and superheating the methanol it is possible to double the value of the energy that can be recovered.

It should be noted that the vaporization energy would also need to be provided if the reforming were to be done at atmospheric pressure. However, this energy can not be recovered unless a Rankine-like cycle is used.

One advantage of the use of combined Rankine/reforming is that the energy recovery process would be still highly efficient even if the reforming does not result in full conversion of the methanol.

There has been a considerable amount of work on catalytic reforming of methanol, mostly driven by desired of production of hydrogen for fuel cell vehicles. In this case, it is desired to minimize the concentration of C0 in the exhaust, which makes for a very difficult problem. In the case of application to an engine, C0 is a fuel and will burn well in the internal combustion engine, so substantial concentrations of C0 are not deleterious for the operation of the engine.

It is possible to non-catalytically decompose methanol. However, it requires high temperatures, ~700-900 C. These temperatures are above those that are practically achievable in engines, and there is the additional problem of coking of the unconverted methanol, even if feasible.

A large compendium of methanol reforming has been presented by Petterson and Sjostrom, [L. Pettersson and K. Sjostrom, *Decomposed Methanol as a Fuel—A review, Combust, Sci. and Tech.* 80. pp. 265-303 (1991)]. There are three categories of reformers: Low temperature catalyst reformer, Cu-based (similar to those used in methanol synthesis); Steam reforming catalysts, usually nickel based; and noble metal catalysts, similar to conventional SI engine catalysts. Part of the issue with the catalyst is the prevention of generation of dimethylether (DME) at lower temperatures, and methane at the higher temperatures.

Most of the work summarized by Petterson and Sjostrom was performed at atmospheric or lower pressures. There are, however, some efforts at high pressures. Catalytic reforming at high pressure was performed by Moller et al., ($Zn-O_2-Cr_2O_3$, 350-380 C, 25 bar), Yoon (Cu/Cr/Mn, 120-482 C and up to 50 bar) and Zhou et al (Cn—Zn—Al, Zn—Cr. $Pd/Al_2O_3$, at 220-400 C and 5-80 bar). Some of this work is that it is either in Chinese or in the patent literature. Yoon disclosed the use of methanol dissociation at high pressure in a Cu-based catalyst [H. Yoon, *Methanol Dissociation Using a Copper-Chromium-Manganese Catalyst*, U.S. Pat. No. 4,407,238 (Oct. 4, 1983)

U.S. Pat. No. 4,499,863 assigned to Ford, uses catalytic (platinum and or palladium) methanol decomposition, as well as methanol, in an engine, with the engine providing energy for the decomposition of the methanol.

Houseman et al., (U.S. Pat. No. 4,567,857) uses high temperature, 200-650 C, for vaporizing and heating the methanol, for use in an SI engine or CI engines, the engine being entirely fueled by hydrogen rich gas or in a mixture of fuels. The energy for the vaporization and heating of the fuel is provided by the exhaust.

Yoon (U.S. Pat. No. 4,444,158, Alcohol Dissociation Process for Automobiles, uses partial oxidation and methanol decomposition catalysts for starting the process and then with thermal decomposition of methanol or methanol/water mixtures. The reformate is introduced into the engine. The exhaust of the engine is used to provide the energy required for the thermal decomposition of the methanol. In a separate patent, (U.S. Pat. No. 4,407,2138, Methanol Dissociation Using a Copper-Chromium-Manganese Catalyst), Yoon proposes a system that operate at 250-900F and at pressures from 1 to 50 bars, for generation of hydrogen through thermal decomposition of methanol, over a catalyst containing Cu, Cr and Mn. He does not mention using the engine to provide the heat required for the reforming operation.

Figure 4:
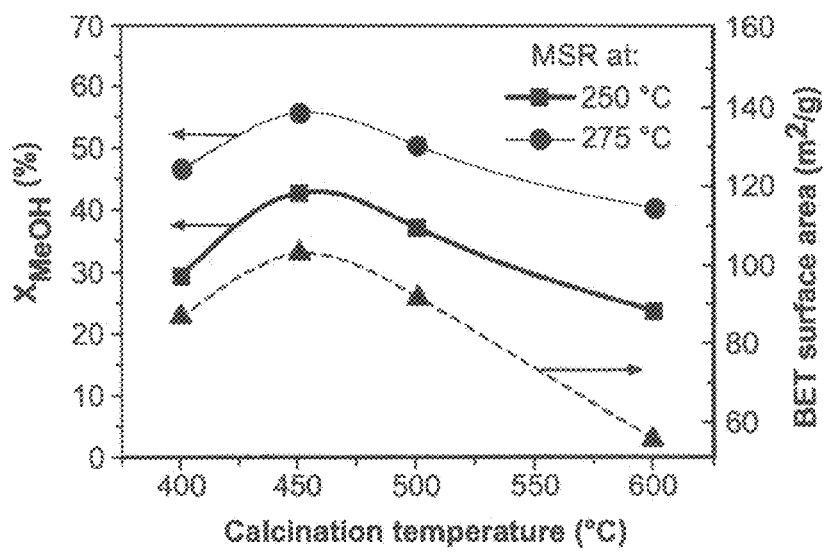
FIG. 4 is a graph illustrating methanol conversion in methanol steam reforming over catalytic CuZn-foam calcined at different temperatures.
Figure 5:
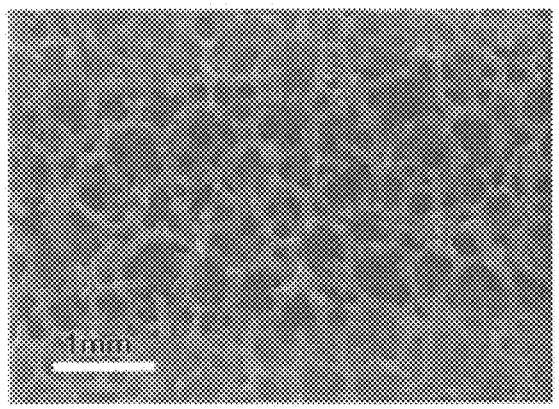
FIG. 5 is a photograph of metallic foam that can be used in the invention.

Reforming using catalysts on metal foams has been investigated recently. We are focusing on foam-supported catalysts because of the benefits of using metallic foams as an integral part of the heat exchangers. It is found that the mass transfer (as well as heat transfer) is substantially improved over conventional catalysts that use pebble-bed catalysts. The experiments were performed with a CuZnAlZr catalyst on a CuZn metal foam. FIG. 4 shows results of conversion of methanol/water with MSR (Methanol steam reforming), as a function of the temperature of calcinations of the copper-based catalyst and substrate, on a microreformer (MR) made from CuZn metallic foam. [H. Chen, H. Yu Y. Tang et al., *Assessment and optimization of the mass-transfer limitation in a metal foam methanol microreformer, Applied Catalysis A. General* 337 (2008( 155-162] The performance of the catalyst is adequate, even at relatively mild conditions (temperatures ~250 C). FIG. 5 shows a photograph of the reticulated foams.

Figure 6:
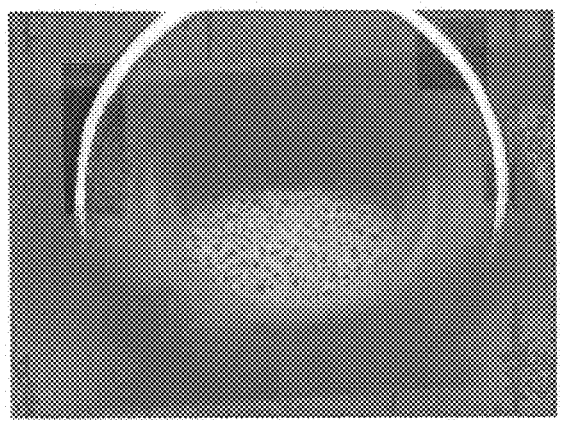
FIG. 6 is a photograph of a catalyst-on-foam reactor integrated into a catalytic converter for automotive applications.

FIG. 6 shows a photograph of a catalyst-on-foam reactor, which uses CuZn as the base material [information provided by Dr. Dieter Girlich, M. PORE GmbH, Enderstrasse 94(G), 01277 Dresden, 0049 351 2502290, info@m-pore.de]

Figure 7:
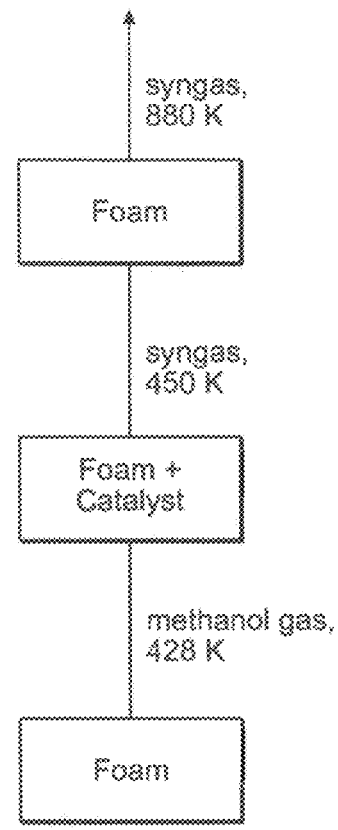
FIG. 7 is a schematic diagram of a reforming process for methanol decomposition onboard vehicles.

FIG. 7 shows a schematic diagram of the heat exchanger and reformer. The foals outside of the range of temperature are not coated with catalyst, in order to prevent the formation of undesirable products (DME at the low temperature, methane at the high temperature). The fuel is preheated and superheated in the same or a different "cans" that has the bare foams, and reformed using foam-based catalysts. As mentioned before, the reformer needs also to provide a substantial heat, as the reaction is endothermic.

The heat exchanger design described below includes the heat transfer issues, but does not address the mass transfer limitations and finite reaction speeds of the reformer.

The design of the heat exchanger/catalyst is important to the successful implementation of the ultra-high efficiency methanol concept.

The het exchanger (HX) needs to provide good heat transfer between the exhaust, at near atmospheric pressure, and the methanol, at elevated pressure. Over a substantial fraction of the heat exchanger, it is a gas-to-gas heat exchanger. The temperature difference between the exhaust and the methanol should be ~50-100 C for efficient heat exchanger. In addition, the pressure drop, especially in the exhaust, should be small. In addition, the heat exchanger should be compact and light weight. We estimate that the HX should be able to transfer 100-200 kW between the exhaust and the fuel.

Previous work with heat exchangers with reformers has been fairly rudimentary, as the main purpose was to build a device that could produce some reformate for testing in engines. Recently, tools have been developed for the analytic investigation of these heat exchangers, which previously had to be done using empirical models (Kays and London).

In any case, a large surface is required in order to provide relatively small temperature difference between the heat exchanger surfaces and the gas.

There are several ways of providing the large surface area. The first is through the use of micro-machined fins. A problem with the micro-machined approach is the large cost, as they can not be extruded with appropriate metals, and the size is relatively large because of small surface heat transfer coefficient. Micromachining large heat exchanger is expensive. Another difficulty with the micro-machined approach is the existence of boundary layers, as the flow is laminar because of the small dimensions between the fins. One way to break the boundary layer and the laminar behavior is to break the fins periodically. At some point, the fins are broken so frequently, that it is advantageous to go to a situation where the fins are filaments. At that point, there are better materials, as will be described below.

Reticulate foams can be use dins the heat exchanger. FIG. 8 shows a figure of the reticulate foam, from ERG Aerospace. These foams are available in several materials: copper, copper-zinc, aluminum, nickel and other materials. The materials are inexpensive, especially when compared to micromachines elements. They are available from several vendors, including Wintray, which supplies nickel based foams.

It is possible to combine the heat exchanger with the reformer. Substantial exchange of heat is required in the reformer, because of the endothermicity of the reforming.

The properties of the copper foams are listed at the bottom of FIG. 6. The materials are available in different porosity and cell density. Usual porosity is 10%, and cell densities of 10, 20 and 40 Pores-Per-Inch (PPI).

We have developed simple models for the foams, using CFD. We have benchmarked the pressure drop with measurements. And then used the model in order to predict heat exchange. The benchmarking calculations will be presented later.

The model used to determine the characteristics of the foam is shown in FIG. 9. The model has a porosity of 90%. The cell size is 0.64 mm.

Figure 10:
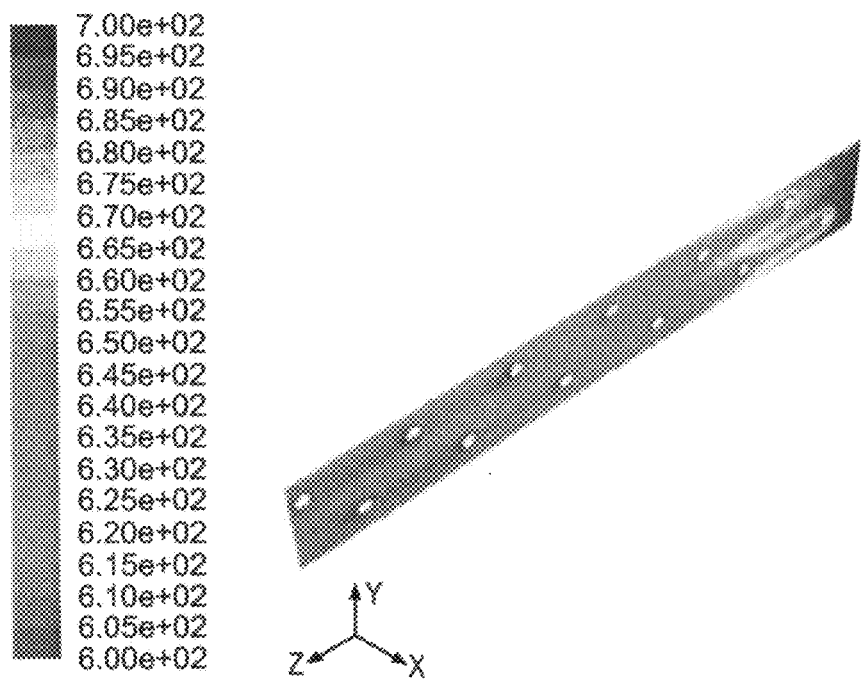
FIG. 10 illustrated contours of constant temperature for exhaust conditions.
Figure 11:
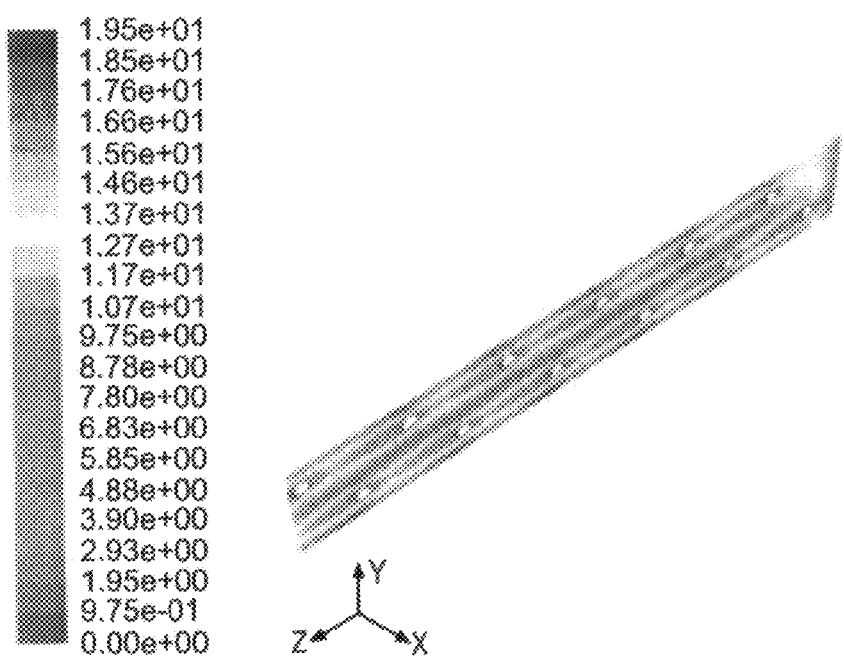
FIG. 11 illustrates contours of constant velocity magnitude for exhaust conditions.
Figure 12:
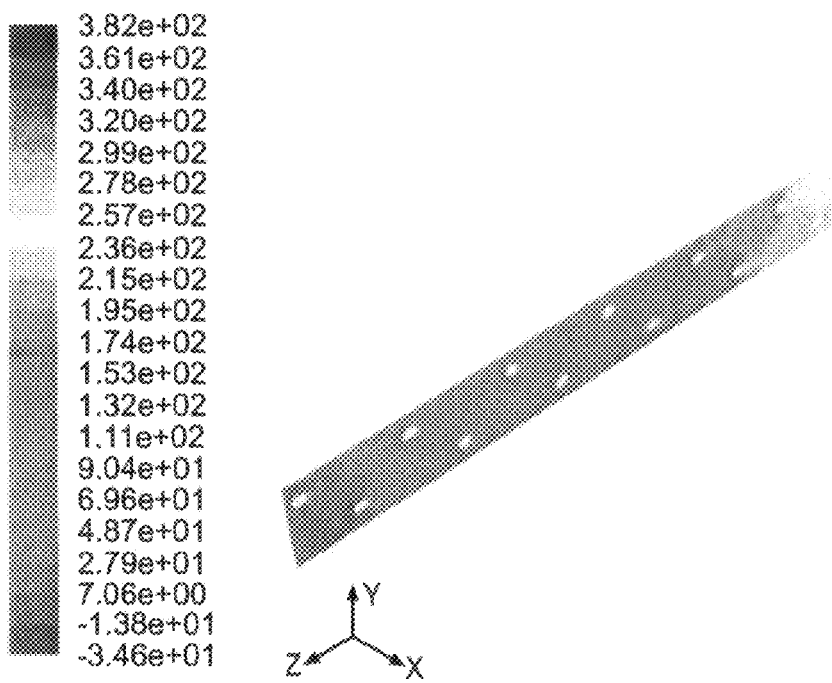
FIG. 12 illustrates static pressure for exhaust conditions.

Calculations of the performance of the HX foam, in the exhaust, are shown in FIGS. 10-12. The parameters of the exhaust are 1 bar, 700 K, density of 0.5 kg/m$^3$, a viscosity of ~34 mPa s, a heat capacity of Cp~1.07 kJ/kg K, and a thermal conductivity of 51 mW/m K (refProp, from NIST, was used to determine the thermodynamic and physical properties of the exhaust). The results pressure, velocity profiles and temperatures for an inlet velocity of 10 m/s, and a temperature differential of 100 K. From these results, we estimate the Darcy friction factor f and the surface heat transfer coefficient h that is use din the calculations. Note the large shear in velocity that results in substantial mixing (and therefore improved heat transfer), at the expense of increased pressure drop, all in a compact unit. We estimate a surface heat transfer coefficient for the exhaust of 800 W/m$^2$ K and a Darcy friction factor f~1100 (independent of Reynolds number).

We have done similar calculations for the syngas. For the syngas we assume a composition of 2 $H_2$+CO, a pressure of 15 bar and 600 K, density of 3.2 kg/m3, a heat capacity of cp~2.8 kJ/kg K, a thermal conductivity is 0.24 W/m K and a viscosity if 25 mPa s (thermodynamic and physical parameters using REFPROP).

Figure 13:
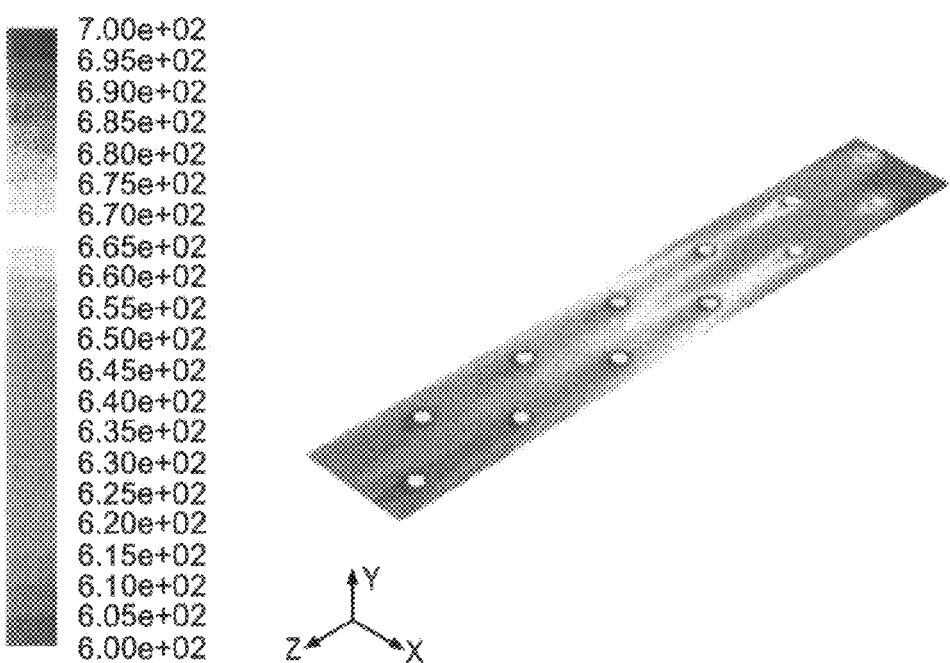
FIG. 13 illustrates contours of constant temperature for syngas conditions.

The profiles of velocity and temperature, assuming 3 m/s flow, and a temperature differential of 100 K (in this case, the foam is hotter than the gas, as the gas is being heated by the foam) are shown in FIGS. 12 and 13. We have used the pressure drop to calculate the Darcy factor and the surface heat transfer coefficient. In this case, h~1600 W/m$^2$ K and f~740 (independent of Reynolds number). It should be noted that the surface heat transfer coefficient is very large, much larger than what can be accomplished with fins.

We have used the friction factor and the surface heat transfer coefficient determined above in order to understand the characteristics of a heat exchanger. It is assumed that there are 40 channels, and every channel can removed up to 2 kW. Thus, it is sized for about half of the potential power. It may be possible to use tow heat exchangers in series or in parallel.

Figure 14:
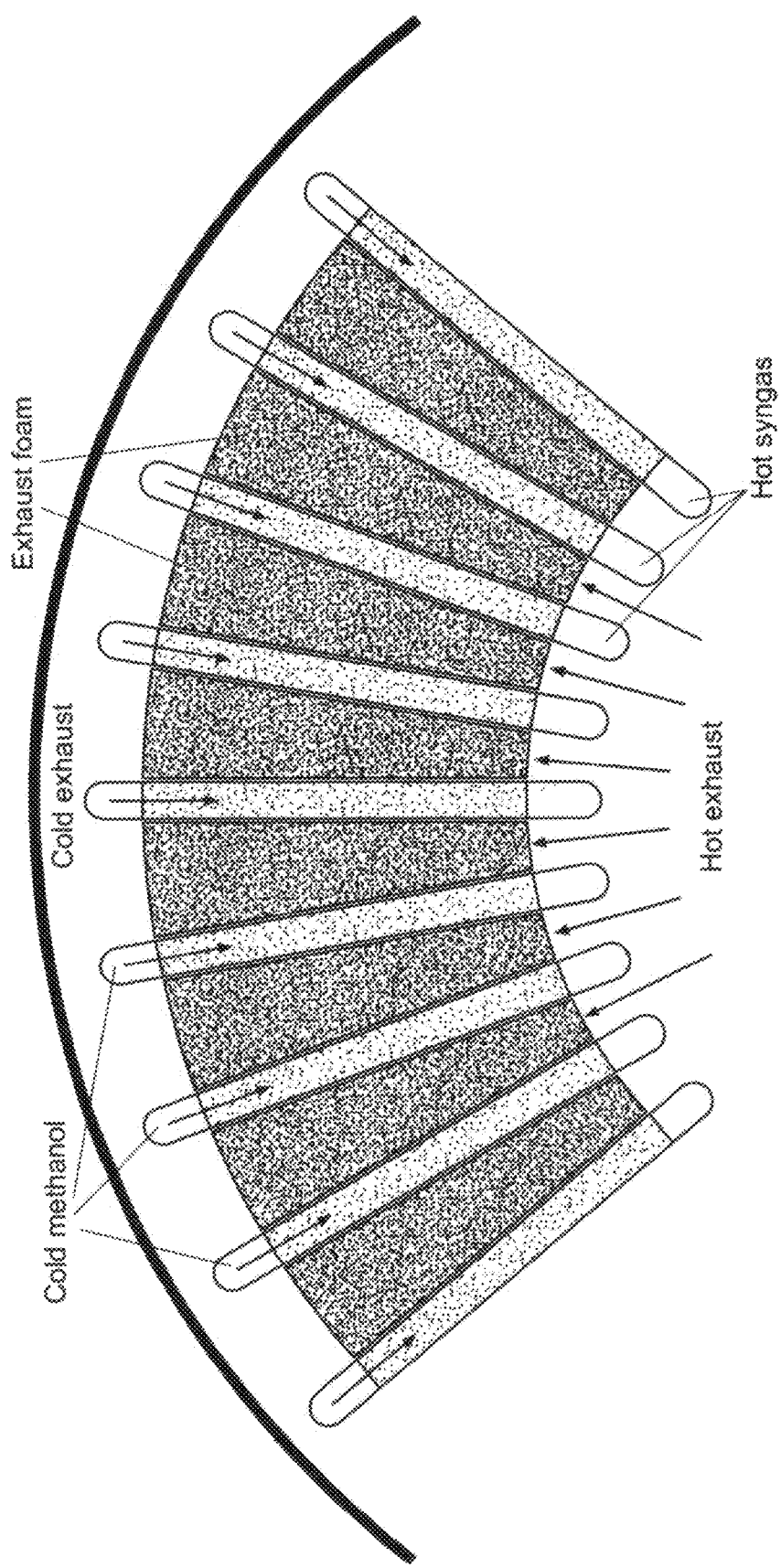
FIG. 14 is a cross-sectional view of a compact heat exchanger according to an embodiment of the invention using foams on both the exhaust and syngas channels.
Figure 15:
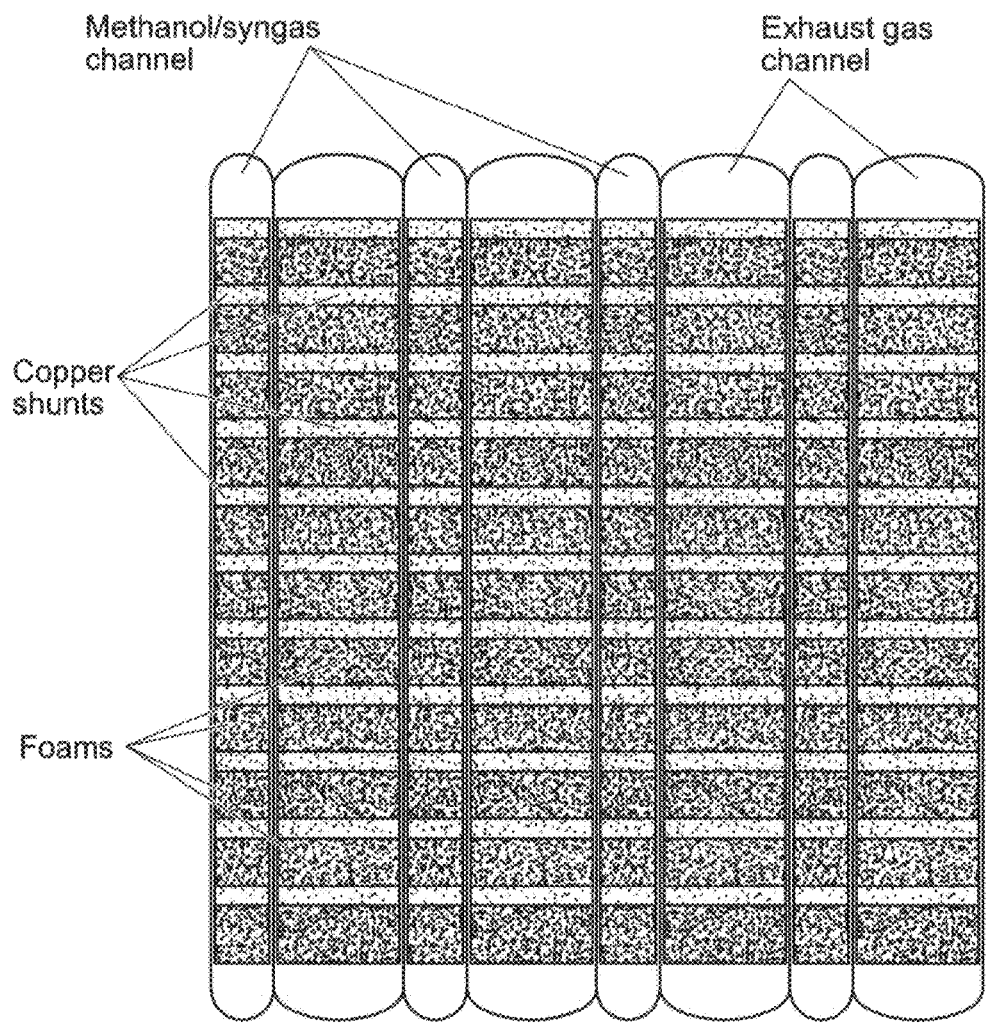
FIG. 15 is a side view of the compact heat exchanger according to an embodiment of the invention.

Schematics of a concept that uses foams-on-fins, through a wall, gas-to-gas heat exchanger is shown in FIGS. 14 and 15.

The hot regions are in the inner zone, in order to minimize heat losses. Both the hot syngas and the hot reformate plenums are placed in the center of the device. Similarly, the cold plenums for the exhaust and for the syngas are in the periphery. FIG. 15 shows a side view of the heat exchanger, illustrating the fins. The design in FIGS. 14 and 15 show independent chambers for the syngas. It is also possible to make an arrangement with pleated wall separating the exhaust from the syngas, but without separate chambers for the different syngas legs. In FIGS. 14 and 15, the high pressure elements (the syngas channels) are made separate, while the main chamber, for the exhaust, is at low pressure.

In order to prevent large temperature differences, $\Delta T$, due to finite thermal conductivity of the foams, we have used an approach of foams-on-fins. It is shown in FIG. 15. The fins are made of solid material with high thermal conductivity. They conduct the heat to the foam (or bring the heat to the barrier, in the case of the exhaust). The foams have very high heat transfer capability (high surface heat transfer coefficient and substantial area), but thermal conduction across the foams is limited. The heat conduction in our concept is carried out by the solid material of the fins.

The plenums for the syngas and for the exhaust gas are shown on top and the bottom. They are located either at the both inner region or outer region (depending on whether it the inlet or the outlet, and whether it is syngas or exhaust), as discussed above. The drawing figures are not to scale, and thicknesses have been adjusted for ease of interpreting the schematics.

Ideally, the fin on one side of die wall separating syngas and exhaust is matched by one on the other side, in order to minimize $\Delta T$ that would occur if ht heat has to travel axially on the wall.

TABLE 5

Overall parameters of heat exchanger.

| | | | |
|---|---|---|---|
| power per channel | W | 2000 | W |
| height of heat exchange region | m | 0.3 | |
| radial extent of heat exchanger region | m | 0.1 | |

| | | EXHAUST LEG | SYNGAS LEG | |
|---|---|---|---|---|
| width channel | m | 0.015 | 0.004 | |
| Deltat T foam if no copper fins | K | 83.33 | 22.22 | |
| Delta T gas to foam | K | 3.76 | 7.26 | |
| Delta-T across fin | K | 7.50 | 2.00 | |
| delta T along foam from fin | K | 18.52 | 9.62 | |
| Delta-T toal for each leg | K | 29.78 | 18.88 | |
| | | | | 48.66 |
| number of channels | | 40 | 40 | |
| width of all foams | m | 0.61 | 0.16 | |
| HX wall thickness | m | 0.001 | 0.001 | |
| sum of plate thicknesse | m | 0.040 | 0.040 | |
| Total circumference | m | | | 0.84 |
| Inner radius of HX | m | | | 0.13 |

The size of the HX is about 40 cm OD and 30 cm long. It is substantially smaller than the DPF (Diesel Particular Filter) that are required now for particular control for this size engine in diesel vehicles. The channel widths are about 1.5 cm for the exhaust channel (which needs to minimize the pressure drop) and about 0.4 cm for the syngas channel. The total temperature difference is on the order for 50 K, driven mostly by the exhaust leg.

TABLE 6

Characteristics of exhaust HX

| | | |
|---|---|---|
| Power per channel | 2000 | W |
| h | 824 | W/m$^2$ K |
| Thermal conductivity of Foam | 200 | W/m K |
| Thermal conductivity of copper | 400 | |
| porosity | 0.9 | |
| tortoisity | 0.3 | |
| Effective k | 6 | W/m K |
| height | 0.3 | m |
| length | 0.1 | m |
| width | 0.015 | m |
| Area per unit volume | 1721 | m$^2$/m$^3$ |
| Volume | 0.00045 | m$^3$ |
| | 0.77 | m$^2$ |
| Heat flux foam | 66867 | W/m$^2$ |
| Delta T across foam if no copper fins | 83.33 | K |
| Delta T gas to foam | 3.76 | K |
| If fins | | |
| foam | 0.01 | m |
| fin | 0.002 | m |
| fraction of area | 0.1667 | |
| Delta T along fin | 7.50 | K |
| Delta T along foam from fin | 18.52 | K |
| Velocity | 3.5 | m/s |
| Delta p | 338 | Pa |
| Volume flow rate | 0.0875 | m$^3$/s |
| Power | 29.58 | W |
| Total pumping power | 1194 | W |
| Mass flow rate per channel | 0.0065 | kg/s |
| Exhaust mass flow rate | 0.26 | kg/s |
| number of channels | 40 | channels |

It is assumed that the power per channel in the HX is about 2000 W. The flow speeds of exhaust is larger that for the syngas, shown in Table 7. It is assumed that the material of the foams have lower thermal conductivity than the fins. We have used numbers for nickel and copper. It is assumed that the foams are 90% porous. The surface heat transfer coefficient is smaller than that of syngas, but it is still high. The width of the channel is assumed to be 1.5 cm. The fins are 2 mm thick. The pressure drop is about 340 Pa. (about 0.003 bar).

TABLE 7

Overall parameters of the syngas HX

| | | |
|---|---|---|
| Power per channel | 2000 | W |
| h | 1.60E+03 | W/m$^2$ K |
| Foam (Aluminum, nickel) | 200 | W/m K |
| Fins (copper) | 400 | W/m K |
| porosity | 0.9 | |
| tortoisity | 0.3 | |
| Effective k | 6 | W/m K |
| height | 0.3 | m |
| length | 0.1 | m |
| width | 0.004 | m |
| Area per unit volume | 1721 | m$^2$/m$^3$ |
| Volume | 0.00012 | m$^3$ |
| | 0.21 | m$^2$ |
| Heat flux foam | 66666.67 | W/m$^2$ |
| Delta T across foam in no copper fins | 22.2 | K |
| Delta T gas to foam | 7.3 | K |
| If fins | | |
| foam | 0.01 | m |
| fin | 0.002 | m |
| height | | m |
| fraction of area | 0.167 | |
| Delta T along fin | 2.0 | K |
| Delta T along foam from fin | 9.6 | K |
| Velocity | 1.5 | m/s |
| Delta p | 525 | Pa |
| Volume flow rate | 0.0018 | m$^3$/s |
| Power | 0.94 | W |
| Mass flow rate per channel | 0.00095 | kg/s |
| Total mass flow rate (B100) | 0.037667 | kg/s |
| number | 40 | channels |

The heat exchanger is very compact. In particular, the length of the region with the temperature gradient is on the order of 10 cm. The length is about 30 cm. There is a substantial thermal gradient along the radial direction of the heat exchangers shown in FIGS. 14 and 15. There are several problems with the thermal gradient. Axial thermal conduction (thermal conduction in the direction parallel to the flows and of the thermal gradient) needs to be minimized. This can be achieved by designing the fins in segments, so that they are not continuous in the radial direction. The thermal conductivity of the foam is small, but if needed, it could also be segmented. The walls that separate the two fluids cannot, of course, be separated. The thickness of the wall can be minimized by using the fins to support the pressure in the syngas channel.

It should be noted that the thermal mass of the two fluids is not the same. The thermal mass of the methanol/syngas is substantially smaller than that of the exhaust. However, the methanol channels needs to be vaporized and reformed. Both effects increase the thermal energy recovery capability of the exhaust, to the point where most of the heat of the exhaust can be recovered.

So far this patent application has discussed the possibility of a heat exchanger (recuperator). There is a possibility of using a regenerator, where the exhaust first flows in one direction, followed by the fuel flowing the opposite direction. Continuity of flows is obtained by using more than one regenerator, or by continuous flow through a regenerator that is moving with respect to the flows. IN this case, there is no exchange of energy through the solid, minimizing the issues of temperature differences due to finite thermal conductivity of the medium. The use of regenerators has been held back by complications of pressure/leakage between the tow flows in the case of the moving regenerator, and by the finite leakage and issues during the transients. The large pressure differential in the present application increases the hurdles that the regenerator concept faces.

Use of methanol or methanol-reformate can result in overall improved efficiency because of the following changes to the engine or its operating mode:
1. The use of high compression ratio (13-15) enabled by the strong knock suppression provided by the intrinsic octane of alcohol fuel plus the effect of evaporative cooling, or the intrinsic high octane of hydrogen rich gas.
2. Engine downsizing, through the use of high levels of boosting.
3. Exhaust gas heat recovery by reforming/heating the alcohol using exhaust heat and a suitable low temperature reforming catalyst.
4. Use of the hydrogen-rich gas to enable very lean operation of the engine at low loads (or alternatively heavy EGR).

Alcohol fuels have very high octane fuel ratings. In addition, there is substantial charge cooling that results in large resistance against knock. Engine efficiency improves by about 5% per every 2 numbers change in compression ratio.

Boosting results in increased power density, allowing the decrease of the engine size for constant power/torque. The decreased size results in decreased friction. Combined with increased compression ratio, it is possible to increase the efficiency of a gasoline, SI engine by about 25-30%, reaching comparable efficiencies than today's diesel engine.

In exhaust energy recovery, depending on the nature of the alcohol, the heating value of the fuel can be increased by up to 20%. At constant engine efficiency, the net effect is a further increase in efficiency by 20%.

Finally, hydrogen-rich gas enables operation of the engine at substantially high air/fuel ratios ($\lambda>2$). This can further increase efficiency by around 10%. At higher loads the engine is operated with a stoichiometric fuel/air ratio and emissions are controlled by the highly effective three way catalyst. This very lean operation is suitable for light duty vehicles and heavy duty vehicles that are not used for long haul operation. The addition of the hydrogen-rich gas can also be used to enable operation with heavy EGR with a stoichiometric fuel/air ratio.

However, if lean operation is used, the potential for energy recovery is decreased, due to the decrease in the available enthalpy of the exhaust. The tradeoff of ultra-lean operation with decreased exhaust-energy recovery with that of stoichiometric operation with larger exhaust-energy recovery needs to be investigated.

Figure 16:
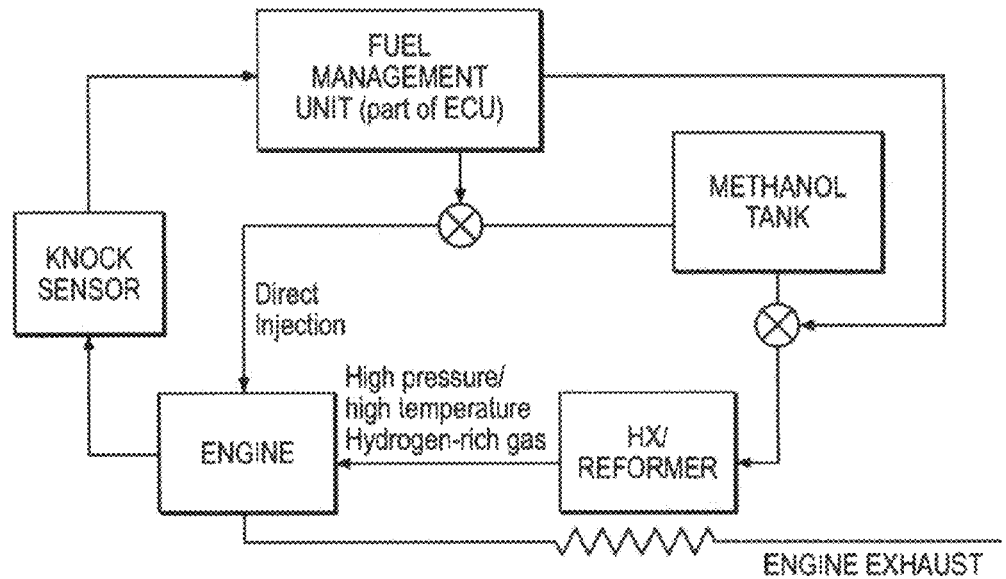
FIG. 16 is a block diagram of an embodiment of the invention including knock sensor feedback control on the ratio of methanol injected into the engine to methanol sent to the heat exchanger/reformer.

The efficiency gain of combining these three effects can be maximized by reforming as much of the alcohol as possible and use the direct (or port fuel) injection of the alcohol only in an amount needed to prevent knock at high loads. A closed or open loop control circuit determined the ratio of direct (or port) injected alcohol to the amount of alcohol that is sent to the reformer. FIG. 16 shows a schematic of an engine control system where the ratio of methanol directly injected to that of methanol reformed is controlled by a knock sensor.

A plasma or an partial oxidation process can be used for rapid start up of the reformer or for providing additional heat to facilitate the reforming. Heat can be provided to pyrolytic reforming by adding air into the reformer. Plasma or partial oxidation heating may be needed for certain engine conditions. The plasma can be a non thermal plasma. It could also be an arc plasma that could be operated when needed to provide additional heat. Plasma enhanced reforming may be particularly important for cold start.

The optimized use of these factors can provide a 20-30% efficiency gain in a methanol fueled, methanol reformed spark ignition engine relative to a diesel engine in a light duty vehicle in a typical drive cycle. This level of efficiency can might also be obtained in a non long-haul truck which has a high fraction of low load operation time. The efficiency gain over a naturally aspirated port fuel injected gasoline engine would be 50-60%. The efficiency gain over a diesel engine for a long haul truck would be 15-25%, as a larger fraction of the fuel can be reformed at high load.

Figure 17:
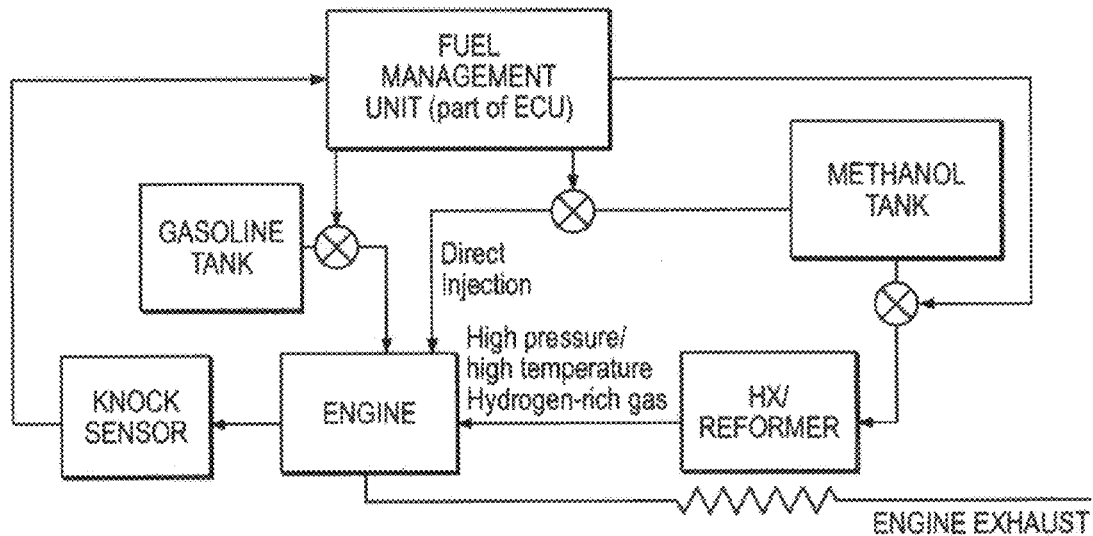
FIG. 17 is a block diagram of a reformer enhanced alcohol engine according to an embodiment of the invention with an option for gasoline use.

The ultra-high efficiency reformer enhanced engine can also employ the option of using gasoline as shown in FIG. 17. There would be two tanks: the first tank for the alcohol (or alcohol with a low enough gasoline concentration) and the second tank for gasoline or a mixture of alcohol and gasoline. Only alcohol or alcohol with a low enough concentration of gasoline so as to avoid damaging the reformer catalyst and provide the desired knock suppression would be used in the first tank. The fuel in the second tank would be sent to the reformer only if the concentration of gasoline is sufficiently low so as not to damage the reforming catalyst. The gasoline concentration would be determined by a sensor which could then determine whether the fuel in the second tank would be sent to the reformer. If the gasoline concentration in the second tank is too high the second tank fuel would be sent directly to the engine.

The control system for the reformer enhanced alcohol engine can also include a feature that uses sensor measurements of the exhaust temperature and or features of the reformate to control engine operation characteristics, including spark retard and fuel/air ratio, to achieve desired reformer performance. These measurements can also be employed to control plasma heating and to change the amount of air or water in the reformer. A closed or open loop control system could also control the duration of the plasma heating needed for cold start.

A engine that uses exhaust energy recovery could be considerably simpler than a turbocharged direct injection engine and could potentially be produced by retrofitting of existing port fuel injected naturally aspirated gasoline engines. Such an engine could potentially provide an efficiency gain of 30% over conventional port fuel injected naturally aspirated gasoline engines.

While the greatest efficiency gain can be obtained when the alcohol is methanol, significant efficiency gains can be made with the alcohol Rankine cycle when the alcohol is ethanol. When ethanol is used it may be advantageous to use an ethanol-water mixture which maximized the exhaust reforming process. On embodiment includes a means for adding water to the tank that contains the ethanol. Mixtures of ethanol and methanol can also be used.

Methanol and ethanol Rankine cycle heat recovery system can be employed with stationary engines as well as with vehicular engines.

Another variation of alcohol Rankine cycle heat recovery is to use it with gas turbines. Heat recovered from the turbine combustor exhaust would be used for the Rankine cycle instead of heat from a reciprocating engine and the reformate from the reformation of alcohol by the recovered heat would be introduced into the turbine combustor instead of the engine cylinders.

The contents of the references discussed above in this patent application are incorporated herein by reference in their entirety.

It is recognized that modifications and variation of the invention will be apparent to those of ordinary skill in the art and it is intended that all such modifications and variations be included within the scope of the appended claims.

What is claimed is:

1. An engine system comprising;
   a source of liquid alcohol;
   an internal combustion engine generating exhaust gas;
   a structure for introducing a first portion of the liquid alcohol into the engine;
   a series of heat exchangers forming a Rankine heat recovery cycle extracting heat from the exhaust gas and transferring the heat to a second portion of the liquid alcohol causing it to change phase to a gaseous alcohol;
   a heat exchanger/catalyst heated by the exhaust to reform the alcohol into a hydrogen-rich reformate;
   a valve structure for introducing the reformate into the engine for combustion; and
   a control system for controlling a ratio of the first and second portions of the liquid alcohol to maximize an amount of the second portion of the liquid alcohol while using a minimum amount of the first portion needed to prevent knock, further including an additional heat exchanger extracting heat from engine cooling water to preheat the liquid alcohol.

2. The engine system of claim 1 further including a turbine through which the reformate flows before introduction into the engine.

3. The engine system of claim 1 wherein the engine is operated with a lean fuel-to-air ratio.

4. The engine system of claim 1 wherein the engine is operated with EGR.

5. The engine system of claim 1 wherein the heat exchanger/catalyst includes a metallic foam.

6. The engine system of claim 5 wherein the metallic foam is disposed on fins.

7. The engine system of claim 1 wherein the alcohol is methanol.

8. The engine system of claim 1 wherein the alcohol is ethanol.

9. The engine system of claim 1 wherein the engine is a spark ignition engine and the reformate is introduced into engine cylinders.

* * * * *